США009449499B2

United States Patent
Weber et al.

(10) Patent No.: US 9,449,499 B2
(45) Date of Patent: Sep. 20, 2016

(54) CONNECTORIZED WIRELESS NODE USED TO DISTRIBUTE POWER AND CONTROL DEVICES IN A POWER DISTRIBUTION SYSTEM

(71) Applicant: TYCO ELECTRONICS CORPORATION, Berwyn, PA (US)

(72) Inventors: Ronald Martin Weber, Annville, PA (US); Stephen Mark Jackson, Cincinnati, OH (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 601 days.

(21) Appl. No.: 13/804,661

(22) Filed: Mar. 14, 2013

(65) Prior Publication Data
US 2014/0265634 A1    Sep. 18, 2014

(51) Int. Cl.
*G08C 17/02* (2006.01)
*H01R 13/66* (2006.01)
*H01R 13/70* (2006.01)
*H01R 31/06* (2006.01)
*H05B 37/02* (2006.01)
*H01H 35/00* (2006.01)

(52) U.S. Cl.
CPC ............ *G08C 17/02* (2013.01); *H01R 13/6683* (2013.01); *H01R 13/70* (2013.01); *H01R 31/065* (2013.01); *H05B 37/0254* (2013.01); *H05B 37/0263* (2013.01); *Y10T 307/773* (2015.04)

(58) Field of Classification Search
CPC .............. G08C 17/02; H05B 37/0254; H05B 37/0263; H01R 31/065; H01R 13/6683; H01R 13/70; Y10T 307/773; H04Q 9/00

USPC .................................................. 307/116, 352
See application file for complete search history.

(56) References Cited

U.S. PATENT DOCUMENTS

| 5,835,326 A * | 11/1998 | Callaway ........... H01R 13/6666 361/111 |
|---|---|---|
| 6,545,584 B2 * | 4/2003 | Turner ............................ 337/38 |
| 6,744,150 B2 * | 6/2004 | Rendic ........................... 307/38 |
| 6,762,570 B1 * | 7/2004 | Fosler ................ H05B 37/0254 315/294 |
| 7,027,431 B1 * | 4/2006 | Thompson ............. H01R 27/02 348/E7.05 |
| 7,247,994 B2 * | 7/2007 | Roach, Jr. .......... H05B 37/0272 315/149 |
| 7,884,732 B2 * | 2/2011 | Huizenga ............... H01H 47/24 315/291 |
| 7,994,654 B2 * | 8/2011 | Lee et al. ....................... 307/39 |
| 8,242,640 B2 * | 8/2012 | Lee et al. ...................... 307/117 |
| 8,626,318 B2 * | 1/2014 | Wu .................... H05B 33/0803 315/113 |

(Continued)

FOREIGN PATENT DOCUMENTS

WO    2010 / 123239 A2    10/2010
WO    WO 2011064244 A2 *    6/2011    ............. G08C 17/02

OTHER PUBLICATIONS

International Search Report, International Application No. PCT/US2014/021806, International Filing Date, Mar. 7, 2014.

*Primary Examiner* — Jared Fureman
*Assistant Examiner* — Michael Warmflash

(57) ABSTRACT

A connectorized wireless node used to distribute power and control devices in a system. The connectorized wireless node includes a housing, power control circuitry and wireless control circuitry. The power control circuitry is provided in the housing and distributes power to the devices. The wireless control circuitry is provided in the housing and receives wireless signals which contain control information. The wireless control circuitry cooperates with the power control circuitry to control the devices within a system.

16 Claims, 8 Drawing Sheets

(56) References Cited

U.S. PATENT DOCUMENTS

| | | | | |
|---|---|---|---|---|
| 8,931,032 B2* | 1/2015 | Egan | ............... | H04N 7/106 361/809 |
| 2006/0075447 A1* | 4/2006 | Arashin | ............... | H01R 27/02 725/100 |
| 2008/0177402 A1* | 7/2008 | Chang | ............... | H05B 37/029 700/90 |
| 2009/0247006 A1* | 10/2009 | Thompson | ............... | H02G 3/121 439/527 |
| 2009/0278479 A1* | 11/2009 | Platner et al. | ............... | 315/312 |
| 2010/0076615 A1* | 3/2010 | Daniel | ............... | F03D 9/00 700/293 |
| 2010/0164284 A1 | 7/2010 | Lee et al. | | |
| 2010/0290787 A1* | 11/2010 | Cox | ............... | 398/115 |
| 2011/0012434 A1 | 1/2011 | Lee et al. | | |
| 2012/0001488 A1* | 1/2012 | Puschnigg | ............... | H01R 13/665 307/40 |
| 2012/0001567 A1* | 1/2012 | Knapp et al. | ............... | 315/291 |
| 2013/0335020 A1* | 12/2013 | Moore | ............... | H02J 7/025 320/109 |
| 2014/0087742 A1* | 3/2014 | Brower et al. | ............... | 455/450 |

* cited by examiner

CONNECTORIZED WIRELESS NODE USED TO DISTRIBUTE POWER AND CONTROL DEVICES IN A POWER DISTRIBUTION SYSTEM

FIELD OF THE INVENTION

The invention is directed to wireless building systems and wireless connector nodes therefore, and more particularly to a system and nodes which provide wireless control functionality within the connectors used to distribute power.

BACKGROUND OF THE INVENTION

Existing connectors used in building and furniture for power distribution are predominately passive devices that simply pass power through them. They typically lack any control or sensing function. However, as it is becoming more important to conserve energy and control devices within a building, wireless networks are being used to actively monitor and control the devices.

The term "wireless network" is used herein to refer to any network to which a wireless computing device or a wireless communications device can connect through wireless means. A wireless connection is commonly achieved using electromagnetic waves, such as radio frequency ("RF") waves, to carry a signal over part or all of the communication path. Wireless networks can be private or public in nature and can be designed for two-way communications or for one-way broadcasts. Examples of wireless networks are 802.11, Bluetooth, HyperLAN, Ultra Wideband Radio, and Radio Frequency Identification (RFID).

In order to provide for wireless communications, a wireless node or modules is typically wired into the circuitry. Therefore, in order to provide any type of control system which can monitor and control various devices, a wireless module must be provided to allow for the devices to be controlled through wireless means. Typically the wireless modules are wired into the circuitry.

One such wireless node or component is shown in U.S. Pat. No. 7,247,994. The housing of the wireless network component contains the internal electronics necessary for the wireless network component to perform the functionality needed or desired on the wireless network. The housing of the wireless network component may be equipped with a power port (e.g., an outlet, plug, socket or the like) for electrically connecting the wireless network component to a power supply. As mentioned, the power supply used to power the wireless network component may be the power supply of a fluorescent light, a commercial power line, or another available power source. In other embodiments, an alternative power supply, such as a replaceable and/or rechargeable battery may be contained within the housing of the wireless network component.

U.S. Pat. No. 7,884,732 illustrates another such wireless node or device. The radio-controlled relay device can integrate a wireless radio, a relay (or one or more relays), a controller, a dimming device, a power sensor and a signal generator in a stand-alone package that can easily be installed in a typical fluorescent fixture. It can be installed between ballast and the ballast power source and is powered by the lighting circuit. The housing of the device includes a small magnet to enable the easy placement and positioning of the device against a lighting fixture, such as for example a fluorescent light fixture. In this manner, the device is held in place with a thin magnet and the electrical connection is achieved using wire nuts. The device can be connected to an existing fixture by cutting and stripping wires and using wire nuts to connector the wires and wireless device.

It would be beneficial to provide a device which implements wireless control functionality within a connector which is used to distribute power. In so doing, separate connectors or nodes for the wireless and wired functions are not required, thereby reducing cost and simplifying installation. By providing the both wireless control functionality and power distribution, they can easily be incorporated into any system used in building wiring.

SUMMARY OF THE INVENTION

An embodiment is directed to a connectorized wireless module which implements wireless control functionality within a connector which is used to distribute power. In so doing, separate connectors or nodes for the wireless and wired functions are not required, thereby reducing cost and simplifying installation. By providing both wireless control functionality and power distribution, the connectorized wireless module can easily be incorporated into any system used in building wiring, including preexisting wiring systems. The system allows for easy installation and allows for control of the building devices, allowing for a more cost effective and energy conscience system.

An embodiment is directed to a connector used to distribute power. The connector includes an antenna for receiving wireless signals which contain control information. A controller is provided to process the control information. One or more relays are controlled by the controller. The one or more relays control the power distribution to one or more devices electrically connected thereto.

An embodiment is directed to a connectorized wireless node used to distribute power and control devices in a system. The connectorized wireless node includes a housing, power control circuitry and wireless control circuitry. The power control circuitry is provided in the housing and distributes power to the devices. The wireless control circuitry is provided in the housing and receives wireless signals which contain control information. The wireless control circuitry cooperates with the power control circuitry to control the devices.

An embodiment is directed to a power distribution system having a power distribution panel, wires extending from the power distribution panel to provide power to various devices, and connectors for distributing the power. Each connector includes an antenna for receiving wireless signals which contain control information. A controller is provided to process the control information. One or more relays are controlled by the controller. The one or more relays control the power distribution to one or more devices electrically connected thereto.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
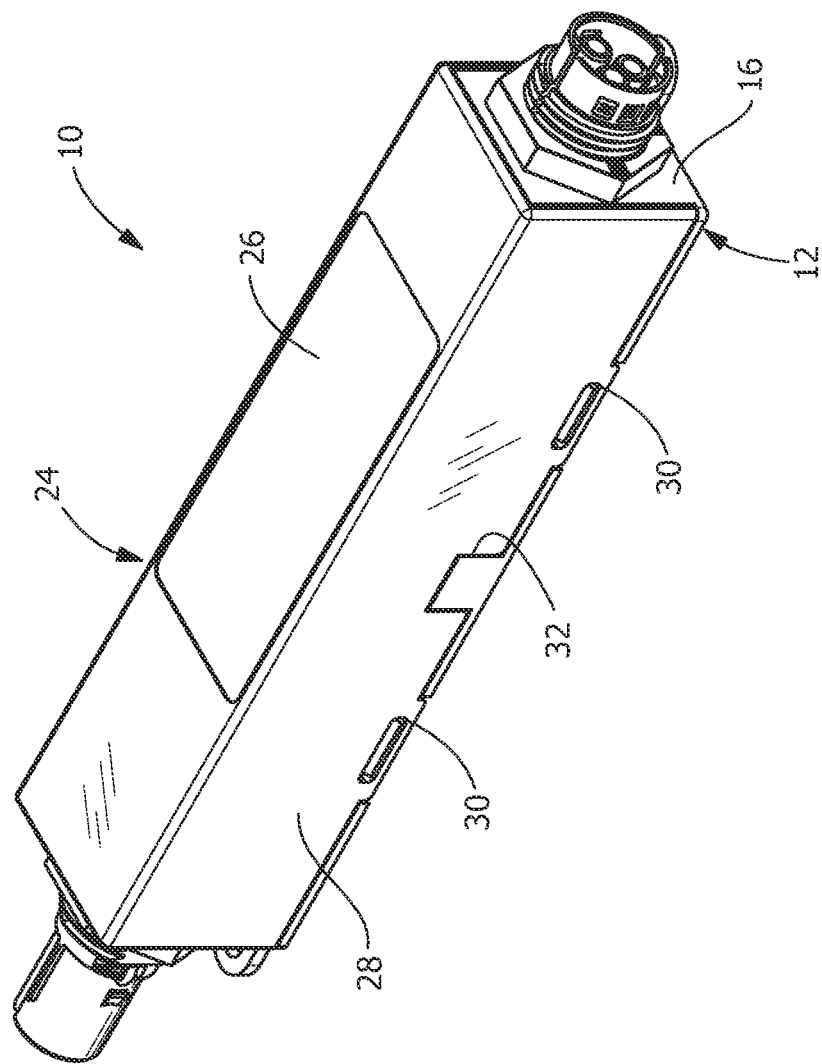
FIG. 1 is a perspective view of a wireless connector node according to the present invention.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

The embodiments of the present invention are directed to a wireless connector node and a wireless system of use in buildings, furniture and the like, for controlling lighting, dampers and other such devices. As will be more fully described, the connector nodes implement wireless control functionality with the connectors used to distribute the power to the various devices.

Figure 2:
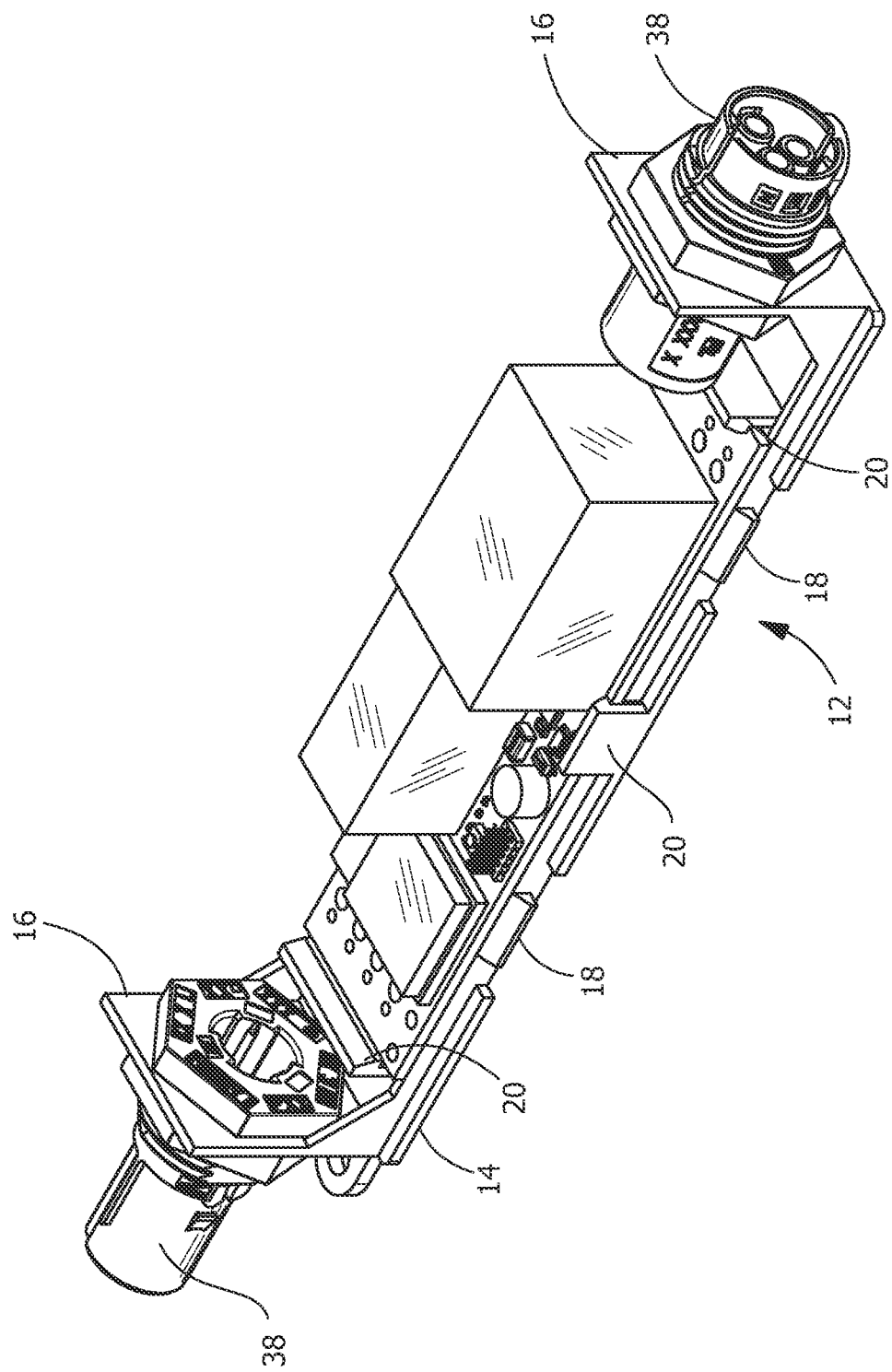
FIG. 2 is a perspective view of the wireless connector node of FIG. 1 with a cover removed.

FIGS. 1 and 2 show a connector/connectorized wireless node 10 in accordance with one embodiment of the present invention. The connector/connectorized wireless node 10 has a base 12 with a bottom wall 14 and end walls 16 extending upward therefrom. The base has holding projections 18 which extend from sides of the base. The holding projections 18 are spaced periodically about the base 12 and cooperate with a cover, as will be more fully described. Resilient latching projections 20 also extend from the base. The latching projections 20 extend from sides of the base upwardly. The latching projections 20 cooperate with printed circuit board 36 to maintain the circuit board 36 in position on the base 12.

Figure 7:
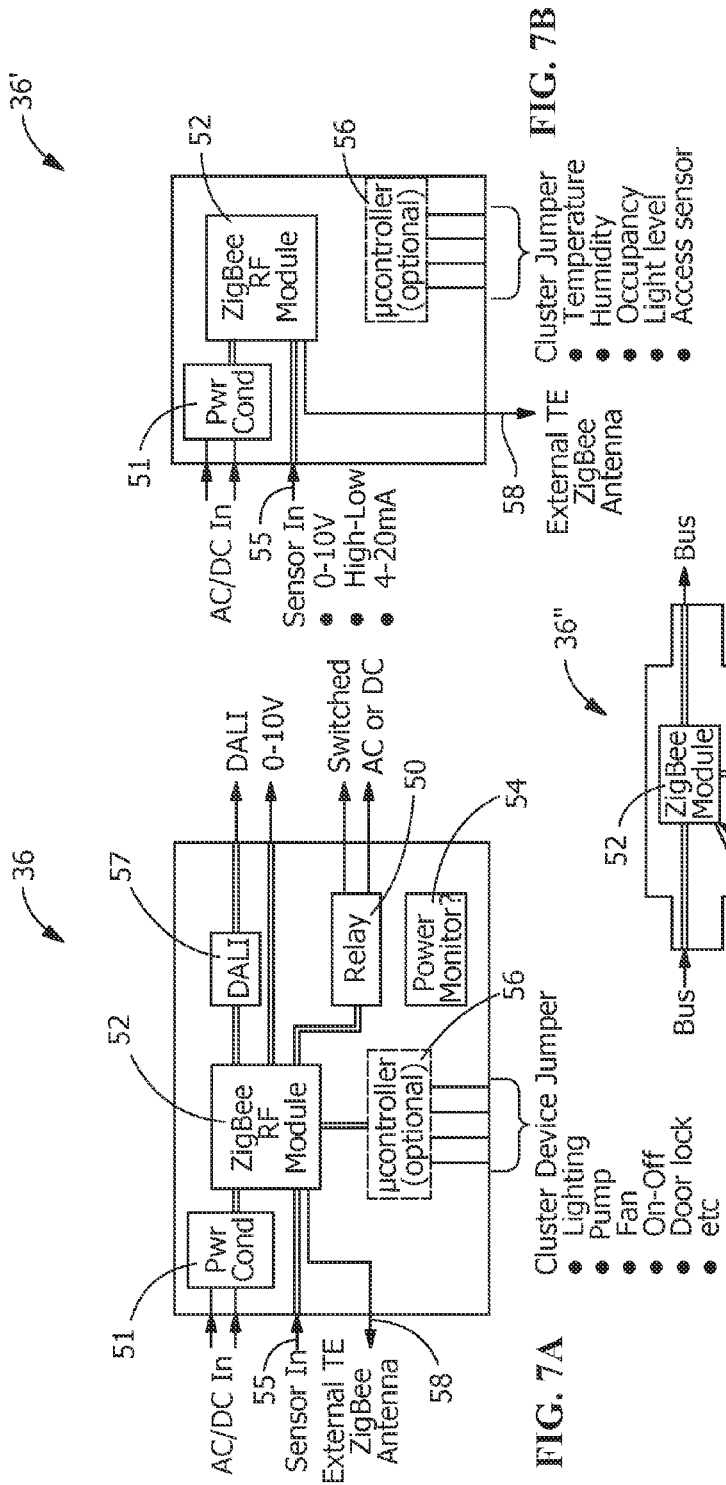
FIG. 7A is a schematic view of the circuitry housed in an input/output wireless connector node.
FIG. 7B is a schematic view of the circuitry housed in a sensor wireless connector node.
FIG. 7C is a schematic view of the circuitry housed in an splitter wireless connector node.

A cover 24 is provided on the connector/connectorized wireless node 10. The cover has a top wall 26 and side walls 28 which extend from the top wall. Openings 30 are provided on the side walls 28. The openings 30 are positioned to cooperate with the holding projections 18 to properly position and maintain the cover 24 in position on the base 12. Openings 32 are also provided on the side walls 28 and are dimensioned to receive latching projections 20 therein. With the cover 24 removed from the base, a recess or cavity 34 is exposed. The recess 34 houses circuitry 36 (FIG. 7) which provides the power distribution and the wireless functionality, as will be more fully described below.

Figure 8:
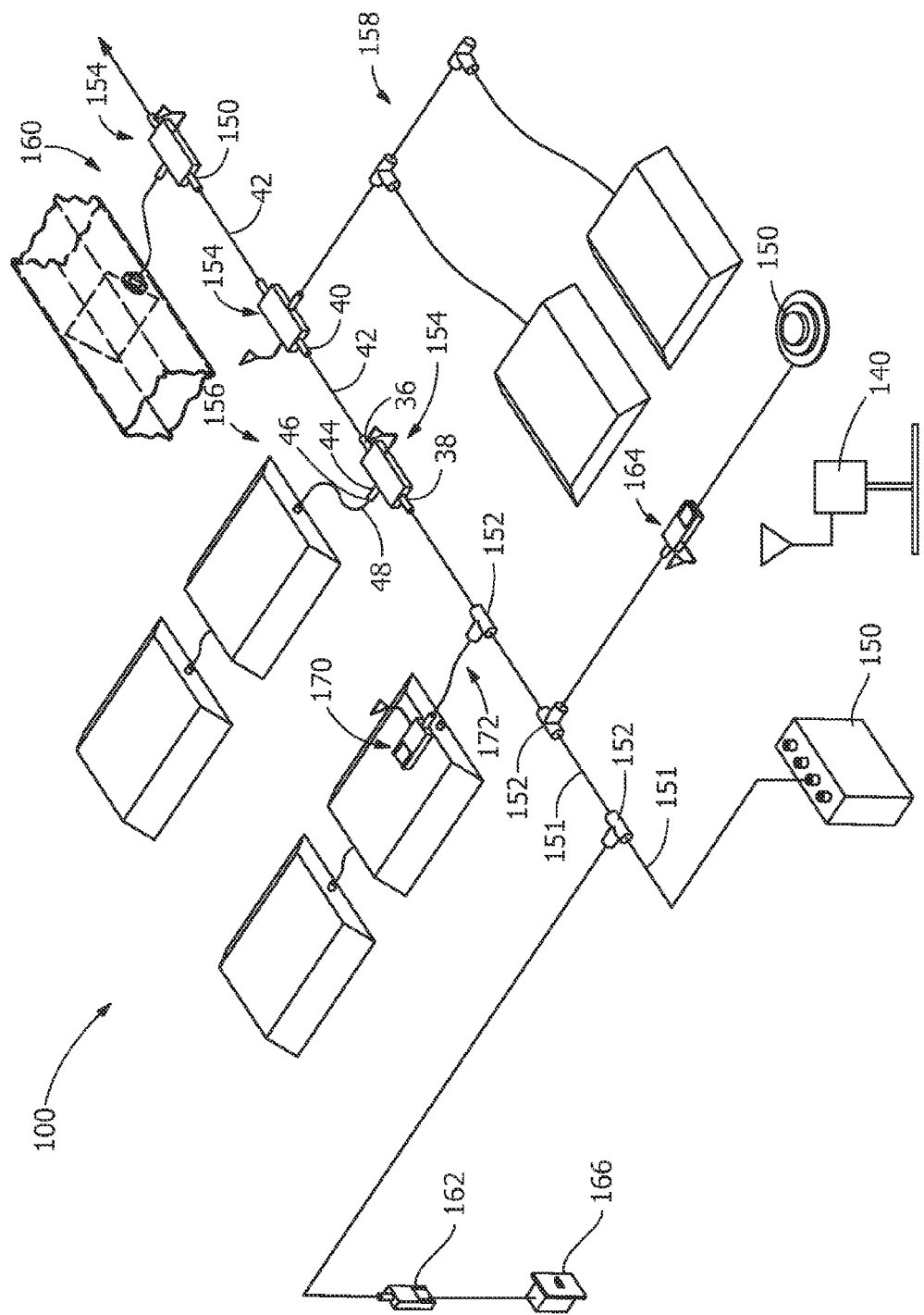
FIG. 8 is a diagrammatic view of a wireless system in which the wireless connector nodes are used.

In the embodiment shown, mating projection 38 extend from end walls 16. The mating projections 38 are provided to cooperate with mating connectors 40 of wires 42 (as shown in FIG. 8). Mating projections 38 contain electrical contacts that are wired or otherwise connected to the control printed circuit board 36.

While the connector/connectorized wireless node 10 is shown in FIGS. 1 and 2 as having two mating projections 38, other configurations may be used without departing from the scope of the invention. As an example, as shown in FIG. 8, connector/connectorized wireless node 10 may have an additional mating projection 44, which extend from a respective side wall 28. In this embodiment, the side walls 28 may extend from the base 12 rather than the top wall 26 of the cover 24. The additional mating projection allows the connector/connectorized wireless node 10 to act as a splitter, allowing the mating projection 44 to cooperate with mating connectors of wires 48 which are connected to devices, such as lighting, etc.

In the illustrative embodiment shown in FIGS. 1, 2 and 8, the mating projections 38 are provided in electrical engagement with mating connectors 40 which are terminated to wires 42 which are used to distribute power throughout the system 100, whether such power is AC (120V or 240V), DC low voltage or DC high voltage. In contract, the mating projections 44 are provided in electrical engagement with the mating connectors which are terminated to wires 48 which are used to provide power the lighting fixtures, dampers and other such devices. The circuitry 36 controls the power sent to the devices through the mating projection 44.

As the circuitry 36 of the connector 10 provides both wireless control functionality, through wireless control circuitry, and the ability to distribute the power to the various devices, through power control circuitry, the ability to implement a wireless control network in a building is simplified as compared to the known art.

Figure 3:
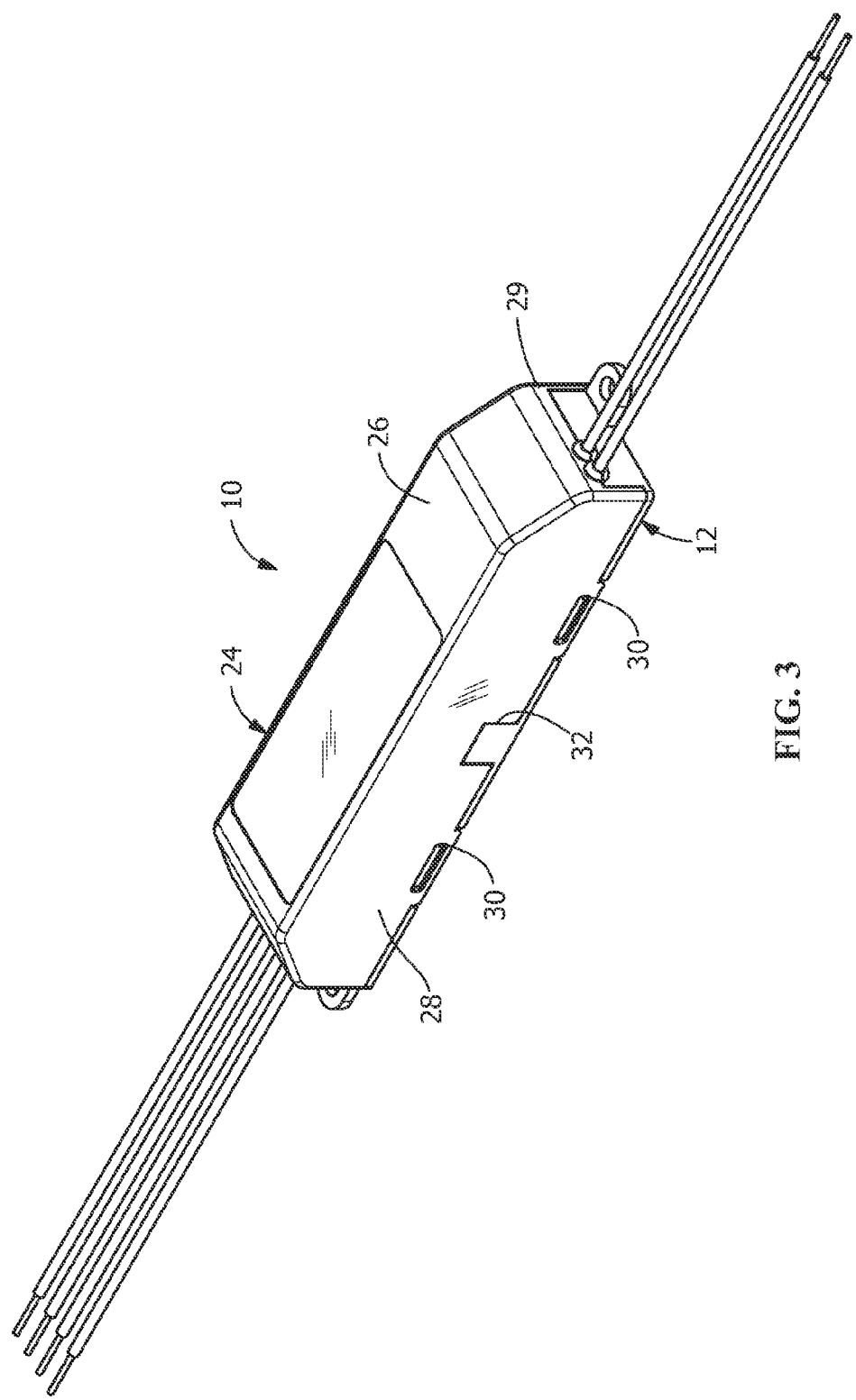
FIG. 3 is a perspective view of a first alternate wireless connector node according to the present invention.
Figure 4:
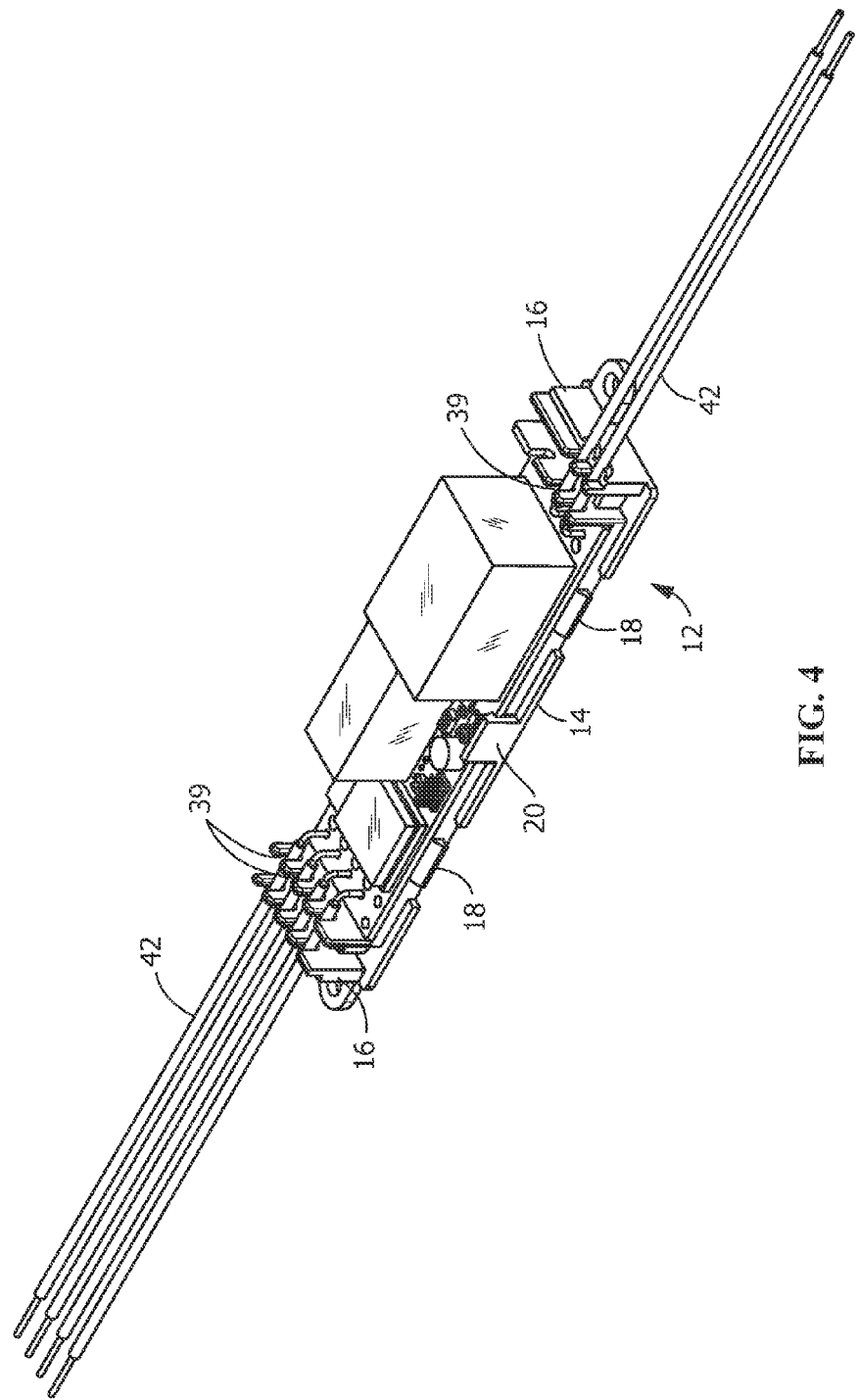
FIG. 4 is a perspective view of the first alternate wireless connector node of FIG. 3 with a cover removed.

FIGS. 3 and 4 show the connector/connectorized wireless node 10 in accordance with a second embodiment of the present invention. The connector/connectorized wireless node 10 has a base 12 with a bottom wall 14 and partial end walls 16 extending upward therefrom. The base has holding projections 18 which extend from sides of the base. Resilient latching projections 20 also extend from the base. The latching projections 20 extend from sides of the base upwardly and serve to secure the control printed circuit board 36 in the connector 10.

A cover 24 is provided on the connector/connectorized wireless node 10. The cover has a top wall 26 and side walls 28 which extend from the top wall. Partial end walls 29 also extend from the top wall 26. In the embodiment shown, the top wall 26 has angled portions, but such angled portions are not required. Openings 30 are provided on the side walls 28. The openings 30 are positioned to cooperate with the holding projections 18 to properly position and maintain the cover 24 in position on the base 12. Openings 32 are also provided on the side walls 28. The openings 32 cooperate with the latching projections 20 to secure the control printed circuit board in the connector 10. With the cover 24 removed from the base, a recess or cavity 34 is exposed. The recess 34 houses circuitry 36 (FIG. 7) which provides the power distribution and the wireless functionality, as will be more fully described below.

In the embodiment shown, wire receiving slots 39 are provided proximate end walls 16. The wire receiving slots 39 are provided to secure and guide wires 42 therein. Wires 42 are terminated to the control circuit board 36 by solder or other termination means readily apparent to those versed in wire to board terminations. Wire receiving slots 39 are known in the industry, and therefore, a further explanation will not be provided.

Figure 5:
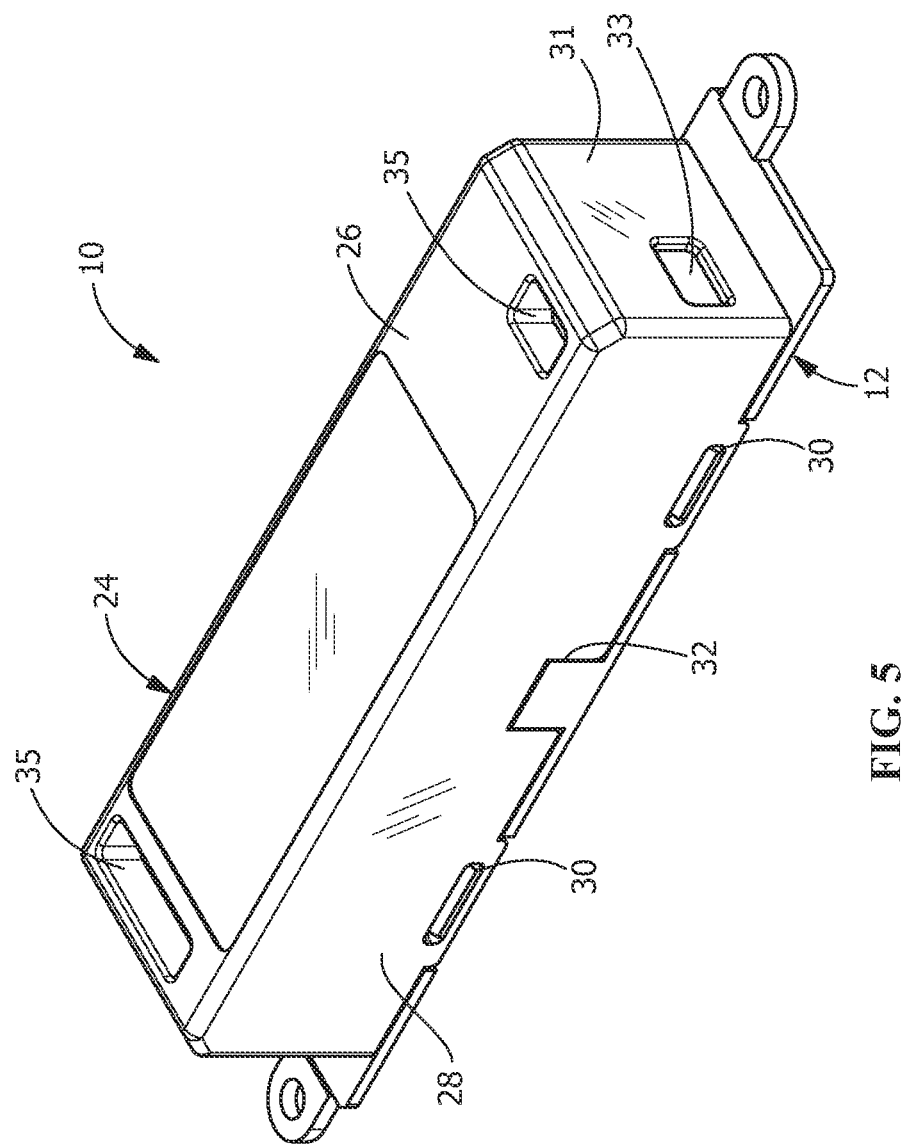
FIG. 5 is a perspective view of a second alternate wireless connector node according to the present invention.
Figure 6:
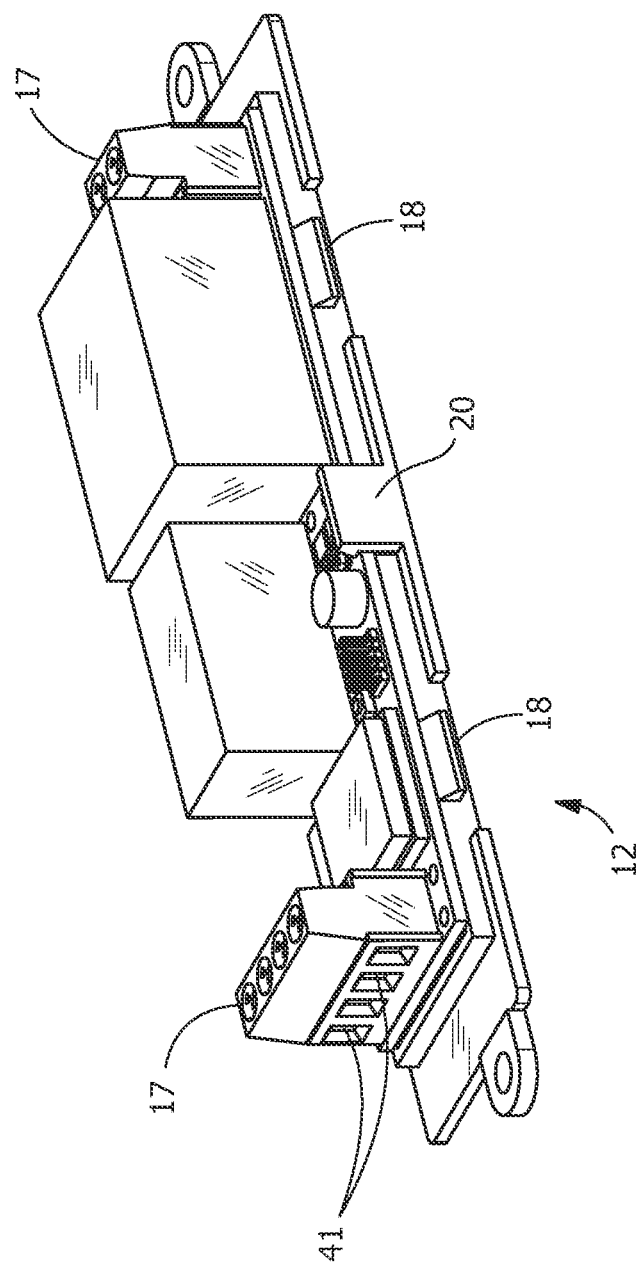
FIG. 6 is a perspective view of the second alternate wireless connector node of FIG. 5 with a cover removed.

FIGS. 5 and 6 show the connector/connectorized wireless node 10 in accordance with a third embodiment of the present invention. The connector/connectorized wireless node 10 has a base 12 with a bottom wall 14 and wire termination members 17 extending upward therefrom. The base has holding projections 18 which extend from sides of the base. Resilient latching projections 20 also extend from the base. The latching projections 20 extend from sides of the base upwardly.

A cover 24 is provided on the connector/connectorized wireless node 10. The cover has a top wall 26 and side walls 28 which extend from the top wall. End walls 31 also extend from the top wall 26. Openings 33 are provided in the end walls 31 to allow insertion of the wires therethrough. Openings 35 are provided in the top wall 26 to allow access to terminate the wires. Openings 30 are provided on the side walls 28. The openings are positioned to cooperate with the holding projections 18 to properly position and maintain the cover 24 in position on the base 12. Openings 32 are also provided on the side walls 28. The openings cooperate with the latching projections 20 to retain the control circuit board 36 to base 12. The circuit board 36 provides the power distribution and the wireless functionality, as will be more fully described below.

In the embodiment shown, wire receiving opening 41 are provided in the wire termination members 17. The wire receiving openings 41 are provided to terminate wires (not shown) therein. The use of wire termination members 17 are known in the industry, and therefore, a further explanation will not be provided.

Referring to FIG. 7A, the circuitry 36 for an input/output type connector/connectorized wireless node 10 is shown. The circuitry 36 includes power regulation or control circuitry such as a power conditioner 51 used to provide low voltage power to control circuitry and one or more relays 50. The circuitry also includes wireless control circuitry such as a control module 52, such as but not limited to, a ZigBee RF module. A power sensor or module 54 may also be provided to monitor and report on power flowing through the node. The relay 50 or similar electrical switching device (such as, but not limited to, a solid state power switch) is controlled by the module 52. The relay or similar electrical switching device controls the power distribution of the connector/connectorized wireless node 10 and switches the AC or DC power flowing through the node. An external antenna 58 is connected to the circuitry to allow the circuitry to receive and send signals from a wireless controller (not shown). Such wireless communication is often achieved using electromagnetic waves, such as radio frequency ("RF") waves, to carry a signal over part or all of the communication path; however other means of wireless communication may be used.

As shown in FIG. 7A, a microcontroller 56 may be provided to provide some level of field configurability to the connector/connectorized wireless node 10. In the embodiment shown, the microcontroller 56 is used to configure the connector/connectorized wireless node 10 for a specific purpose. The microcontroller 56 could be a separate device or could run the controller firmware. For example, by adjusting some switch settings, the connector/connectorized wireless node 10 could be configured to be a temperature sensor or by a different switch setting could activate a door lock. This allows the user to program the connector/connectorized wireless node 10 as needed for the application. Alternatively, if no microcontroller is used, firmware which is specific to an intended application can be uploaded at the factory. In some applications, the microcontroller 56 may be provided to control one or more devices, such as, but not limited to, lighting, HVAC dampers, pumps, fans and door locks.

In some embodiments, the control module 52 may store information related to the unique installation of the connector 10, as will be more fully described below. Additionally or in place of the wireless controller, the circuitry 36 may received signals from sensors (as illustrated at 55) located throughout the building, including, but not limited to temperature sensors, humidity sensors, occupancy sensors, smoke sensors, carbon monoxide sensors, and ambient light sensors. The circuitry 36 may use solid state or relay switching to provide power to any device plugged into the connector/connectorized wireless node 10.

The connector/connectorized wireless node 10, and in particular the circuitry 36 may be configured to store location information and other data attributes related to its unique installation. Such information can include data such as an identifier, group information, and location of the device (e.g., building name, floor, fixture, group, etc.), which can be programmed into the circuitry 36 at or prior to its installation.

Referring to FIG. 7B, an input device that takes signal inputs from sensors and wirelessly transmits them back to the system controller is shown. The circuitry 36' for a sensor type connector/connectorized wireless node 10 is shown. The circuitry 36' includes a power regulator 51, a control module 52 and an optional microcontroller 56. Various methods of controlling devices electrically attached to the circuitry may optionally be provided. For example, as shown in FIG. 7B a microcontroller 56 may be provided to configure the node to accept input from one or more devices, such as, but not limited to, temperature sensors, light level sensors, occupancy sensors or similar devices found in a building envelope, An external antenna 58 is optionally connected to the circuitry to allow the circuitry to receive and send signals from a wireless controller (not shown). The antenna can also be incorporated on the controller printed circuit board as an integrated device as is commonly done in wireless devices. In some embodiments, the control module 52 may store information related to the unique installation of the connector 10, as will be more fully described below. Additionally or in place of the wireless controller, the circuitry 36' may received signals from sensors located throughout the building, including, but not limited to temperature sensors, humidity sensors, occupancy sensors, smoke sensors, carbon monoxide sensors, and ambient light sensors. The circuitry 36' may use solid state or relay switching to provide power to any device plugged into the connector/connectorized wireless node 10.

In these illustrative wiring diagrams, the circuitry is capable of receiving a radio signal or direct signals from sensors that contains control information, including information which the control module 52 or the microcontroller 56 uses to turn on the device, turn off the device or dim the device. This information can be specific to an individual control module or it can be for a group of control modules. The design of the connector/connectorized wireless node 10 and the circuitry 36 makes it compatible with most lighting systems and other devices, thereby allowing the connector/connectorized wireless node 10 to be retrofitted with existing devices and suitable for use in existing buildings, without requiring new ballasts or other such devices.

FIG. 8 is an illustrative diagram of a building control system 100 using the connector/connectorized wireless node 10 of FIGS. 1 through 3. The system 100 integrates sensors and controllers in a wired and wireless network to enable multiple control strategies for lighting, HVAC and other such systems in the building. The system 100 includes one or more radio controlled connectors 10 that can control one or more devices such as ballasts on a lighting fixture, one or more hand-held or wall mounted controllers that can generate control commands and send them over the network. A typical system 100 also includes one or more stand-alone sensors that connect to sensor input nodes as outlined in 7B. These sensor nodes wirelessly communicate sensor inputs to a centrallized controller 140.

The controller 140 is a wireless network controller that accepts inputs from the sensors and turns controlled devices on and off. The controller 140 may also connect to a normal LAN to communicate and report over normal IP data communication channels. The controller 140 can be any such device known in the industry.

Referring to the illustrative embodiment shown in FIG. 8, a manufactured wiring system 100 is shown. Examples of such systems are manufactured and sold by TE Connectivity under the trademarks AMPInnergy, Nector S and Nector M. As shown, connector/connectorized wireless node 10 may be positioned anywhere in the system by mating the mating projections 38, 44 of the connector/connectorized wireless node 10 with mating connector 40.

Power is provided to the system by a power distribution or circuit breaker panel 150 as is typically found in most buildings and residences. In the embodiment shown, the power is distributed through a branch circuit 151 which has multiple splitters 152, 154 which supply power to various devices along the multiple branches of the system 100. Alternatively, multiple branch circuits may extend from the power distribution panel 150.

Splitters 152 are known splitters which distribute power to the various branches of the system 100. These splitters 152 operate in a conventional manner and are not controlled by wireless means. Splitters 154 are an example/embodiment of the connectorized wireless module 10 previously described and include all the features thereof. The splitters 154 receive radio signals, as previously described, and controls a branch of the system 100. This allows one connectorized wireless splitter 154 to control many devices. As an example: the splitter 154 positioned at the beginning of branch 156 controls two lighting fixtures which are connected in series; the splitter 154 positioned at the beginning of branch 158 controls two lighting fixtures which are connected in parallel; and the splitter 154 positioned at the beginning of branch 160 controls an HVAC damper. While branches 156, 158, 160 are shown, splitters 154 may be used to control various other single or multiple devices without departing from the scope of the invention.

In the embodiment shown, the system 100 also includes inline connectorized wireless modules 162, 164 which are also are examples/embodiments of the connectorized wireless module 10 previously described and include all the features thereof. Module 162 is shown as connected in line to a wall mounted switch 166, while module 164 is connected in line to a sensor 168 mounted in a ceiling or other such location. The sensors 166, 168 receive power through the modules 162, 164. In addition, the sensors 166, 168 transmit signals back to the modules 162, 164 based on information detected by the sensors. These signals are then transmitted by the controller 36 to a system wireless controller 140 or directly to other wireless controllers 36 in other connectors 10, thereby allowing the connectorized wireless modules 10 to control respective devices appropriately.

Sensors 166, 168 may include, but are not limited devices that can measure room and building conditions and send the data to the network or appropriate connectorized wireless modules 10. Such sensors may included, but are not limited to, light level sensors that can measure room light levels or motion sensor that can be used to detect motion as a proxy for occupancy.

An connectorized wireless module 170 is provided inline in branch 172. Module 170 is also an example/embodiment of the connectorized wireless module 10 previously described and include all the features thereof. The module 170, which is mounted integral to a respective device, receives radio signals, as previously described, and controls the lighting fixtures of branch 172 of the system 100. This allows one connectorized wireless module 170 to control many devices, as the lighting fixtures are connected in series. Alternatively, the module 170 may be built into the device for which is provides control.

While, in the embodiment shown, the connectorized wireless module 10, such as splitters 154 and modules 170 are used to control multiple devices, other embodiments in which the modules 170 are programmed or installed to control one device can be used without departing from the scope of the invention.

The connectorized wireless module implements wireless control functionality within a connector which is used to distribute power. In so doing, separate connectors or nodes for the wireless and wired functions are not required, thereby reducing cost and simplifying installation. By providing both wireless control functionality and power distribution, the connectorized wireless module can easily be incorporated into any system used in building wiring, including preexisting wiring systems. The system allows for easy installation and allows for control of the building devices, allowing for a more cost effective and energy conscience system. As the connectorized wireless modules are incorporated in the power distribution system, separate connectors for the wireless functionality are not required. In addition, with the incorporation of the connectorized wireless modules in the power distribution system, this function does need to be included in the devices. Consequently, the connectorized wireless modules of the present invention can be used with any new or existing device.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A connector used to distribute power in a building, the connector comprising:
   a housing having at least one first mating projection, the at least one first mating projection cooperates with a mating connector of a wiring system which distribute power in the building, the at least one first mating projection allows the connector to be removably plugged into the wiring system;
   at least one second mating projection, the at least one second mating projection cooperates with mating connectors of one or more devices, the at least one second mating projection allows the connector to be removably plugged into the or more devices;
   a splitter supplying power to the one or more devices along multiple branches of the wiring system which distribute power in the building: a digital addressable lighting interface controlling the one or more devices;
   a controller provided in the housing to process control information, the controller comprising:
      power regulation circuitry to provide low voltage power to control circuitry and one or more electrical switching devices;
      a control module having wireless control circuitry;
      a power module to monitor and report on power flowing through the node;
      the one or more electrical switching devices control the power distribution of the connector and switches power flowing through the connector;
      a microcontroller which provides field configurability to the connector; and
      an antenna for receiving and sending wireless signals which contain control information.

2. The connector as recited in claim 1, wherein control information received by the connector is generated by sensors which are included in a wiring system.

3. The connector as recited in claim 1, wherein the connector has a housing with side walls, end walls, a bottom wall and a top wall, the top wall is removably attached to the side walls and end walls to expose the controller and the one or more electrical switching devices provided in the recess.

4. The connector as recited in claim 1, wherein the controller stores information related to its unique installation of the connector.

5. The connector as recited in claim 1, wherein the microcontroller is provided to control the devices electrically connected to the connector.

6. A connectorized wireless node used to distribute power and control devices in a power distribution system, the connectorized wireless node comprising:
   a housing having at least one first mating projection, the at least one first mating projection cooperates with a mating connector of a wiring system which distribute power in the building, the at least one first mating projection allows the connector to be removably plugged into the wiring system;
   at least one second mating projection, the at least one second mating projection cooperates with mating connectors of a device, the at least one second mating projection allows the connector to be removably plugged into the device;
   power control circuitry provided in the housing, the power control circuitry distributes power to the device through the at least one second mating projection or to a portion of the power distribution system through a respective at least one first mating projection; a splitter supplying power to the one or more devices along multiple branches of the wiring system which distribute power in the building; a digital addressable lighting interface controlling the one or more devices;
   wireless control circuitry provided in the housing, the wireless control circuitry receives wireless signals which contain control information, the wireless control circuitry cooperating with the power control circuitry to control the device or the portion of the power distribution system;
   a power module to monitor and report on power flowing through the node;
   one or more electrical switching devices control the power distribution of the connector and switches power flowing through the connector, the one or more electrical switching devices controlled by the wireless control circuitry; and
   a microcontroller which provides field configurability to the connector.

7. The connectorized wireless node as recited in claim 6, wherein the one or more electrical switching devices are relays.

8. The connectorized wireless node as recited in claim 6, wherein the wireless control circuitry includes an antenna for receiving wireless signals which contain control information.

9. The connectorized wireless node as recited in claim 6, wherein the wireless control circuitry includes a RF signal generator, the RF signal generator sends wireless signals which contains information.

10. The connectorized wireless node as recited in claim 6, wherein the wireless control circuitry stores information related to its unique installation of the connector.

11. The connectorized wireless node as recited in claim 6, wherein the connectorized wireless node has a housing with side walls, end walls, a bottom wall and a top wall, the top wall is removably attached to the side walls and end walls to expose a recess, the wireless control circuitry and the power control circuitry provided in the recess.

12. The connectorized wireless node as recited in claim 11, wherein mating projections are provided on the connectorized wireless node, the mating projections cooperate with mating connectors of a wiring system to allow the connectorized wireless node to be plugged into the wiring system.

13. A power distribution system which integrates sensors and controllers in a wired and wireless network to enable multiple control strategies for devices in a building, the power distribution system comprising:
   a power distribution panel;
   wires extending from the power distribution panel to provide power to various devices;
   splitters which supply power to various of the devices along multiple branches of the power distribution system; a digital addressable lighting interface controlling the devices;
   connectors for distributing the power, each connector comprising:
      a housing having at least one first mating projection, the at least one first mating projection cooperates with a mating connector of a wiring system which distribute power in the building, the at least one first mating projection allows the connector to be removably plugged into the wiring system;
      at least one second mating projection, the at least one second mating projection cooperates with mating connectors of a device, the at least one second mating projection allows the connector to be removably plugged into the device;

a controller to process the control information provided in the housing, the controller comprising;
- power regulation circuitry to provide power to control circuitry and one or more electrical switching devices;
- a control module having wireless control circuitry;
- an antenna for receiving and sending wireless signals which contain control information;
- a power module to monitor and report on power flowing through the node;
- a microcontroller which provides field configurability to the connector;
- one or more electrical switching devices controlling the power distribution to the device electrically connected through the at least one second mating projection or to a portion of the power distribution system through a respective at least one first mating projection; and at least one sensor is electrically connected to a respective connector.

14. The power distribution system as recited in claim 13, wherein the connector receives a radio signal containing control information which is used to control one or more electrical switching devices of the connector and the power distribution within the system.

15. The power distribution system as recited in claim 13, wherein a network controller is provided to send wireless signals to the connectors.

16. The power distribution system as recited in claim 15, wherein the connector has a RF signal generator, the RF signal generator sends wireless signals to the network controller.

* * * * *